US011416842B2

United States Patent

(12) United States Patent
Belostock et al.

(10) Patent No.: US 11,416,842 B2
(45) Date of Patent: Aug. 16, 2022

(54) SYSTEMS AND METHODS FOR TOUCHLESS ALTERNATE PAYMENT PROVIDER SELECTION AT KIOSKS OR PAYMENT TERMINALS USING MOBILE ELECTRONIC DEVICES

(71) Applicant: VeriFone, Inc., Wilmington, DE (US)

(72) Inventors: Jeremy Belostock, Burlingame, CA (US); James Harrison Bullard, Tampa, FL (US); Timothy O'Loughlin, Fort Lauderdale, FL (US)

(73) Assignee: VERIFONE, INC., Wilmington, DE (US)

( * ) Notice: Subject to any disclaimer, the term of this patent is extended or adjusted under 35 U.S.C. 154(b) by 23 days.

(21) Appl. No.: 16/944,936

(22) Filed: Jul. 31, 2020

(65) Prior Publication Data

US 2022/0036333 A1 Feb. 3, 2022

(51) Int. Cl.
*G06Q 20/32* (2012.01)
*H04W 12/06* (2021.01)
(Continued)

(52) U.S. Cl.
CPC ........... *G06Q 20/327* (2013.01); *G06Q 20/18* (2013.01); *H04L 67/42* (2013.01); *H04W 12/06* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 10,664,819 | B1 * | 5/2020 | Zafar | H04W 76/14 |
| 11,055,692 | B1 * | 7/2021 | Bodalia | G06K 19/06037 |

(Continued)

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MUE.2009.62. (Year: 2009).*

(Continued)

*Primary Examiner* — Gregory S Cunningham, II
(74) *Attorney, Agent, or Firm* — Bond, Schoeneck & King, PLLC

(57) ABSTRACT

Systems and methods for touchless alternate payment provider selection at kiosks or payment terminals using mobile electronic devices are disclosed. In one embodiment, at a cloud-based information processing apparatus comprising at least one computer processor, a method for touchless alternate payment provider selection at a payment terminal using a mobile electronic device may include: (1) receiving, from a mobile electronic device and at a uniform resource locator, a communication comprising an identifier for a kiosk or a payment terminal; (2) retrieving an alternate payment provider selection menu; (3) communicating the alternate payment provider selection menu to the mobile electronic device; (4) receiving an alternate payment provider selection from the mobile electronic device; and (5) communicating the alternate payment provider selection to the kiosk or the payment terminal. The kiosk or the payment terminal may generate and display an alternate payment provider-specific code for the selected alternate payment provider.

18 Claims, 4 Drawing Sheets

(51) Int. Cl.

| | |
|---|---|
| ***H04L 67/01*** | (2022.01) |
| ***G06Q 20/18*** | (2012.01) |
| ***H04L 67/02*** | (2022.01) |
| ***H04L 67/10*** | (2022.01) |

(56) References Cited

U.S. PATENT DOCUMENTS

| | | | | |
|---|---|---|---|---|
| 2011/0276418 | A1* | 11/2011 | Velani | G06Q 20/20 705/16 |
| 2011/0282785 | A1 | 11/2011 | Chin | |
| 2013/0054413 | A1 | 2/2013 | Brendell et al. | |
| 2013/0238455 | A1* | 9/2013 | Laracey | G06Q 30/0253 705/21 |
| 2014/0209673 | A1 | 7/2014 | Phillips | |
| 2014/0365371 | A1* | 12/2014 | Ohlhausen | G06Q 20/42 705/44 |
| 2015/0213436 | A1 | 7/2015 | Griffin et al. | |
| 2015/0310421 | A1* | 10/2015 | Xie | G06Q 20/202 705/44 |
| 2016/0155112 | A1* | 6/2016 | Phillips | G06K 19/06037 235/379 |
| 2018/0204210 | A1 | 7/2018 | Butcher et al. | |
| 2018/0240095 | A1* | 8/2018 | Buckley | G06Q 30/0601 |
| 2018/0357636 | A1* | 12/2018 | Kumar | G06Q 20/209 |
| 2019/0205859 | A1* | 7/2019 | Torres da Silveira | G06Q 20/40 |

OTHER PUBLICATIONS

International Search Report and the Written Opinion of the International Searching Authority, International Patent Application No. PCT/US2021/071064, pp. 1-14, dated Oct. 21, 2021.

* cited by examiner

SYSTEMS AND METHODS FOR TOUCHLESS ALTERNATE PAYMENT PROVIDER SELECTION AT KIOSKS OR PAYMENT TERMINALS USING MOBILE ELECTRONIC DEVICES

BACKGROUND OF THE INVENTION

1. Field of the Invention

The present disclosure relates generally to systems and methods for touchless alternate payment provider selection at kiosks or payment terminals using mobile electronic devices.

2. Description of the Related Art

With increasing frequency, merchants are accepting Alternate Payment Provider-based payments, such as PayPal, Venmo, and AliPay, at their payment terminals. Because these payments are typically processed by the specific alternate payment provider's backend, the merchant's payment terminal must display a machine-readable code, such as a QR code, that can be read by an application for the alternate payment provider that is executed by the customer's mobile electronic device to initiate the payment process. Each alternate payment provider uses a different backend, and each uses a different code, it is necessary for the customer to interact with the payment terminal or an employee in order for the proper code to be generated for the selected alternate payment provider.

SUMMARY OF THE INVENTION

Systems and methods for touchless alternate payment provider selection at kiosks or payment terminals using mobile electronic devices are disclosed. In one embodiment, at a cloud-based information processing apparatus comprising at least one computer processor, a method for touchless alternate payment provider selection at a payment terminal using a mobile electronic device may include: (1) receiving, from a mobile electronic device and at a uniform resource locator, a communication comprising an identifier for a kiosk or a payment terminal; (2) retrieving an alternate payment provider selection menu; (3) communicating the alternate payment provider selection menu to the mobile electronic device; (4) receiving an alternate payment provider selection from the mobile electronic device; and (5) communicating the alternate payment provider selection to the kiosk or the payment terminal. The kiosk or the payment terminal may generate and display an alternate payment provider-specific code for the selected alternate payment provider.

In one embodiment, the communication may also include a secure transmission credential.

In one embodiment, the alternate payment provider selection menu may include alternate payment providers supported by the kiosk or the payment terminal.

In one embodiment, the mobile electronic device may display only alternate payment providers in the alternate payment provider selection menu that have applications installed on the mobile electronic device.

In one embodiment, the alternate payment provider-specific code may be input into an alternate payment provider application for the selected alternate payment provider.

In one embodiment, the identifier may be displayed on a screen of the kiosk or the payment terminal as a machine-readable code.

In one embodiment, the alternate payment provider-specific code may include an alternate payment provider transaction identifier.

According to another embodiment, at a mobile electronic device comprising at least one computer processor, a method for touchless alternate payment provider selection at a payment terminal using a mobile electronic device may include: (1) receiving, from a kiosk or a payment terminal, a uniform resource locator and an identifier for the kiosk or the payment terminal; (2) accessing a cloud server at the uniform resource locator; (3) receiving, from the cloud server, an alternate payment provider selection menu and displaying the alternate payment provider selection menu; (4) receiving a selection of an alternate payment provider from the alternate payment provider selection menu; (5) communicating the alternate payment provider selection to the cloud server, wherein the cloud server communicates the alternate payment provider selection to the kiosk or the payment terminal, and the kiosk or the payment terminal generates and displays an alternate payment provider-specific code for the selected alternate payment provider; and (6) receiving, at an alternate payment provider application for the selected alternate payment provider and from the kiosk or the payment terminal, the alternate payment provider-specific code.

In one embodiment, the method may further include communicating, to the cloud server, a secure transmission credential.

In one embodiment, the alternate payment provider selection menu may include alternate payment providers supported by the kiosk or the payment terminal.

In one embodiment, the mobile electronic device may display only alternate payment providers in the alternate payment provider selection menu that have applications installed on the mobile electronic device.

In one embodiment, the uniform resource locator and the identifier for the kiosk or the payment terminal may be received as a machine-readable code.

In one embodiment, the alternate payment provider-specific code may be received as a machine-readable code.

In one embodiment, the alternate payment provider-specific code may include an alternate payment provider transaction identifier.

According to another embodiment, at a cloud-based information processing apparatus comprising at least one computer processor, a method for touchless alternate payment provider selection at a payment terminal using a mobile electronic device may include: (1) receiving, from a mobile electronic device and at a uniform resource locator, a communication comprising an identifier for a kiosk or a payment terminal, a merchant identifier, and transaction data; (2) retrieving an alternate payment provider selection menu; (3) communicating the alternate payment provider selection menu to the mobile electronic device; (4) receiving an alternate payment provider selection from the mobile electronic device; (5) receiving an alternate payment provider transaction identifier from the selected alternate payment provider; (6) generating a transaction page comprising and at least one field for receiving customer login information with the alternate payment provider and communicating the transaction page to the mobile electronic device; (7) receiving the customer login information from the mobile electronic device; (8) communicating the customer login information, the merchant identifier, the alternate payment provider transaction identifier, and the transaction data to the selected alternate payment provider; (9) receiving, from the alternate payment provider, an indication that the transaction is complete; and (10) communicating the indication to the kiosk or the payment terminal.

In one embodiment, the communication may also include a secure transmission credential.

In one embodiment, the alternate payment provider selection menu may include alternate payment providers supported by the kiosk or the payment terminal.

In one embodiment, the mobile electronic device may display only alternate payment providers in the alternate payment provider selection menu that have applications installed on the mobile electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for touchless alternate payment provider selection at kiosks or payment terminals using mobile electronic devices.

Figure 1:
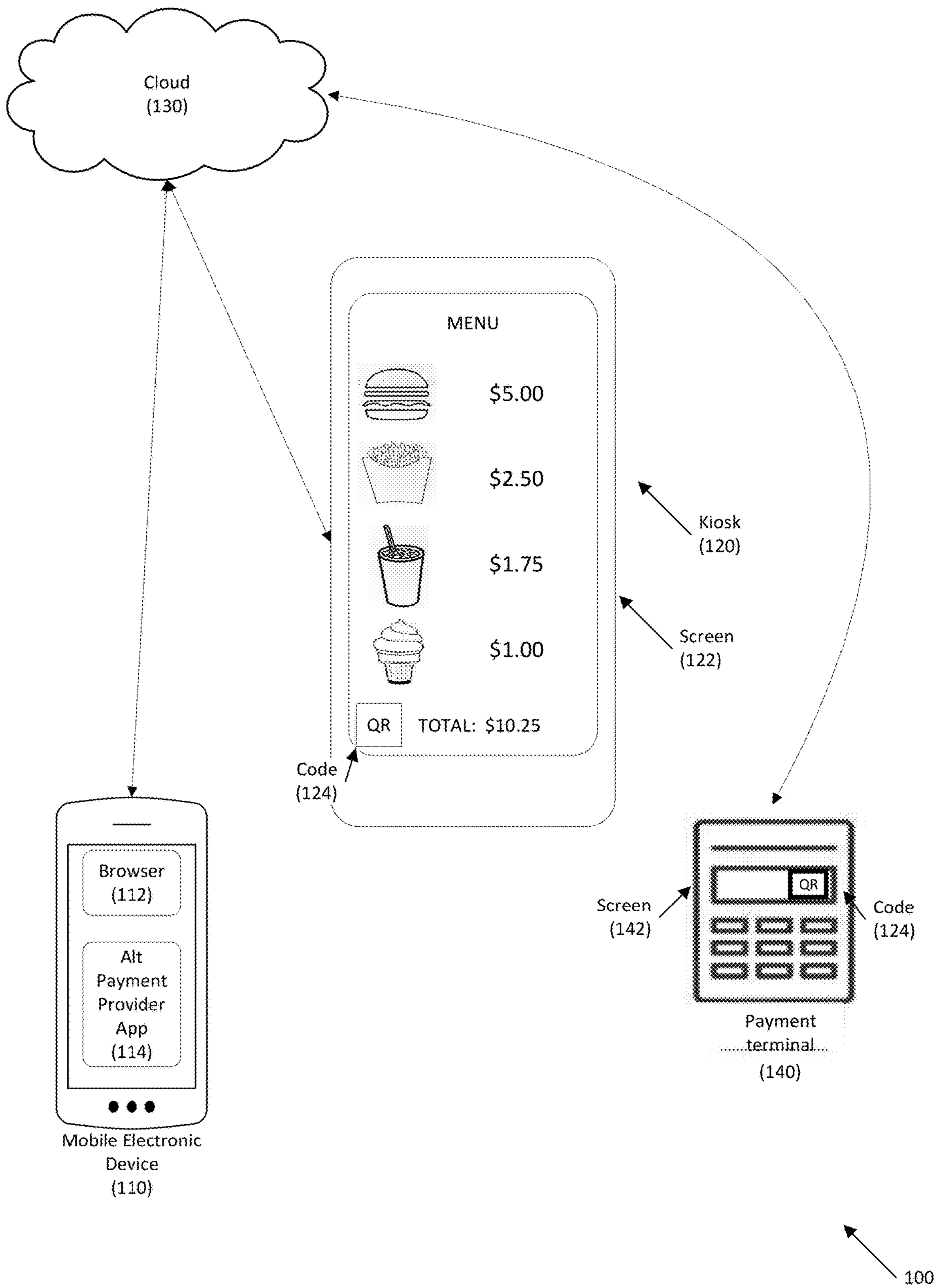
FIG. 1 depicts a system for touchless alternate payment provider selection at payment terminals using mobile electronic devices according to one embodiment.

Referring to FIG. 1, a block diagram for a system for touchless alternate payment provider selection at payment terminals using mobile electronic devices is disclosed according to one embodiment. System 100 may include mobile electronic device 110, which may be a smart phone, a smart watch, a tablet computer, etc. Any suitable mobile electronic device may be used as is necessary and/or desired.

Mobile electronic device 110 may execute browser 112, which may browse to URLs, and one or more alternate payment provider application 114, such as an application provided by PayPal, Venmo, AliPay, etc., to initiate the alternate payment provider payment. In one embodiment, mobile electronic device 110 may include one or more optical input device, such as a camera, a bar code scanner, etc.

System 100 may further include kiosk 120, which may include screen 122. Screen 122 may provide a menu of goods or services that may be purchased. For example, in a restaurant, the menu may identify different menu items that are available to purchase.

In one embodiment, screen 122 may be a touch-sensitive screen.

In one embodiment, screen 122 may provide machine-readable code 124. For example, machine-readable code 124 may be a QR code. In one embodiment, machine-readable code 124 may be dynamic, and may change with each transaction, periodically, etc.; in another embodiment, machine-readable code 124 may be static.

System 100 may further include payment terminal 140 which may display transaction details and receive payment by reading a magnetic stripe, reading an EMV chip, receiving a NFC (RF) transmission, or receiving payment from an alternate payment provider. Payment terminal 140 may include screen 142 that may also display code 124.

In one embodiment, payment terminal 140 may be a mobile point of sale device, a mobile electronic device or computer (e.g., notebook computer, tablet computer, etc.) executing a payment application, etc.

Cloud server 130 may provide an interface between mobile electronic device 110, kiosk 120 and/or payment terminal 140. An example interface may be a website. Cloud server 130 may include one or more cloud-based processors (not shown), one or more database (not shown), etc. In one embodiment, mobile electronic device 110, kiosk 120 and/or payment terminal 140 may access cloud server 130 using a URL.

In one embodiment, code 124 may include a pointer, an address, or other reference to the cloud-based interface or URL.

In one embodiment, cloud server 130 may provide an alternate payment provider menu that is supported by the merchant. For example, the alternate payment provider menu may identify alternate payment providers, such as PayPal, Venmo, AliPay, etc., that are supported by the merchant or payment terminal that the customer may select to conduct the transaction. In one embodiment, cloud server 130 may communicate the alternate payment provider menu to mobile electronic device 110 for customer selection of an alternate payment provider.

In one embodiment, mobile electronic device 110 may display the alternate payment provider menu, and the customer may select the desired alternate payment provider for the transaction from the alternate payment provider menu.

Figure 2:
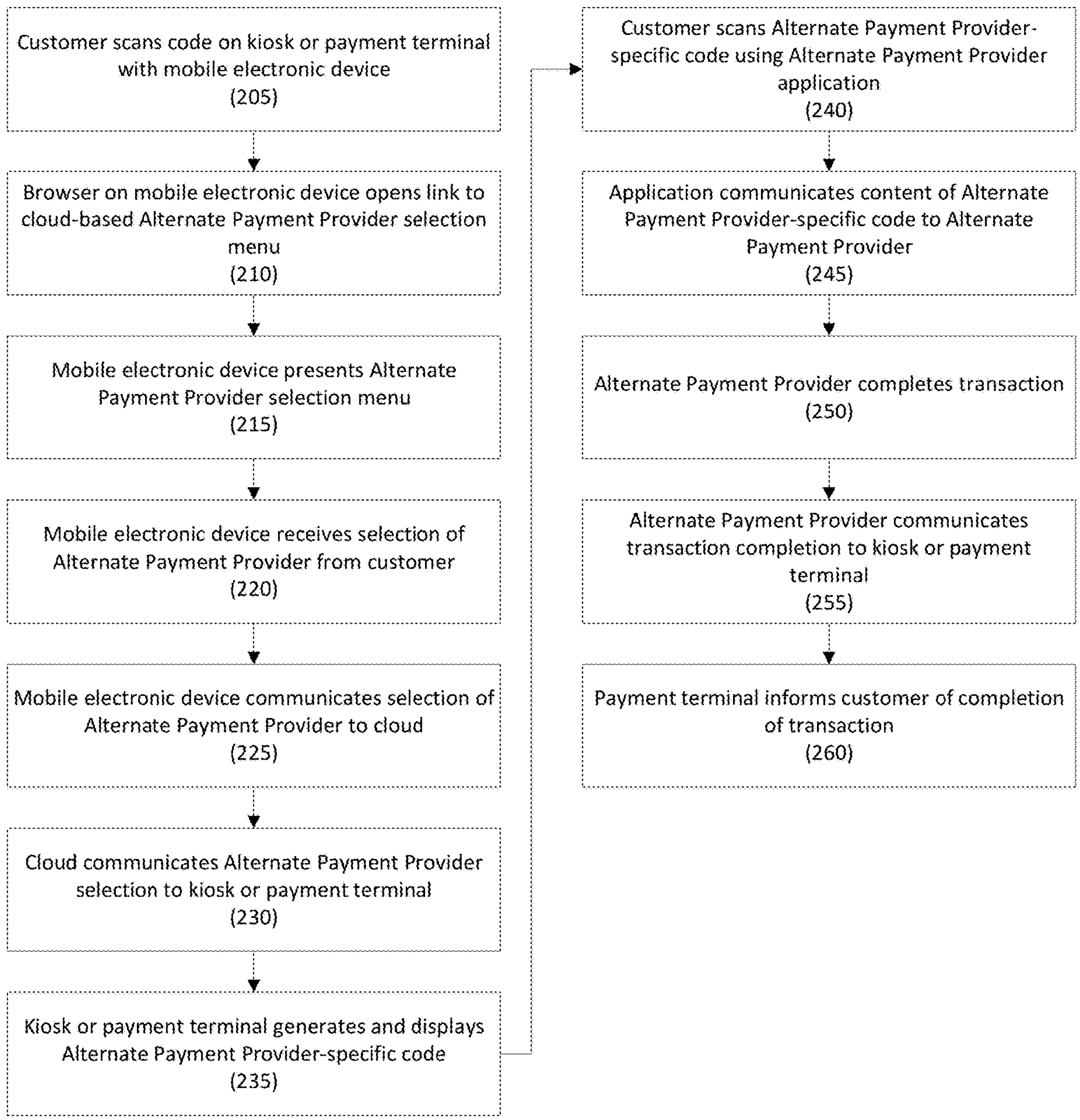
FIG. 2 depicts a method for touchless alternate payment provider selection at payment terminals using mobile electronic devices according to one embodiment.

Referring to FIG. 2, a method for touchless alternate payment provider selection at payment terminals using mobile electronic devices is disclosed according to one embodiment. In one embodiment, instead of touching a payment terminal to select an alternate payment provider, or informing a store employee of the alternate payment provider selection, the customer may instead scan a code, such as a QR code, presented on the kiosk or payment terminal, that that identifies a URL, the merchant, and the kiosk or payment terminal, and may select an alternate payment provider from an alternate payment provider menu displayed on the customer's mobile electronic device. The kiosk or payment terminal may then generate and display the appropriate machine-readable code for the selected alternate payment provider to conduct the transaction.

In step 205, after identifying goods or services to purchase, a customer may scan or enter a code presented by a kiosk or payment terminal using a mobile electronic device. In one embodiment, the code may be presented on a screen of the kiosk or payment terminal, or it may be affixed to the exterior of the kiosk or payment terminal. In one embodiment, the code may be static, and may include a static pointer to a cloud-based URL that is associated with the kiosk or payment terminal; in another embodiment, the code may be dynamic, as the URL may change. The code may further identify the merchant, the kiosk or payment terminal, and may provide any other information as is necessary and/or desired.

In one embodiment, a dynamic URL may be generated for each new connectivity session so that a consumer session and basket data can be sent back to the URL for audit trail recordings as necessary. The dynamic QR may include a merchant specific URL, unique kiosk or payment terminal information (e.g., a kiosk or payment terminal identifier), screen branding for the mobile electronic device screen to match merchant brand requirements, a secure transmission credential (e.g., a TLS 1.2 certificate), etc.

Other types of codes, including standard URLs, short URLs, etc. may be used as is necessary and/or desired. For example, the mobile electronic device may scan a URL and may browse to that location.

In step 210, a browser on the mobile electronic device may browse to the URL in the code. In one embodiment, the browser may include a secure transmission credential (e.g., a TLS 1.2 certificate), the kiosk or payment terminal identifier, etc.

In one embodiment, the cloud server may receive a geolocation for the mobile electronic device and verify that it is near the location of the kiosk or payment terminal.

In one embodiment, the mobile electronic device may effectively be indirectly paired with the kiosk or payment terminal. In one embodiment, the cloud server may take part in negotiating a secure handshake for encryption of the communication channel between the mobile electronic device and the cloud server.

In step 215, the browser or an application executed by the mobile electronic device may retrieve or receive a "menu" of alternate payment providers supported by the merchant and/or the payment terminal from the cloud server. In one embodiment, the alternate payment provider menu may list the supported alternate payment providers supported by the merchant or the kiosk or payment terminal.

In one embodiment, the browser may determine which of the supported alternate payment providers to display based on alternate payment provider applications installed on the customer's mobile electronic device.

In step 220, the customer may select one of the supported alternate payment providers for the transaction, and in step 225, the browser or application may communicate the alternate payment provider selection to the cloud server.

In step 230, the cloud server may receive the alternate payment provider selection and may communicate the alternate payment provider selection to the kiosk or payment terminal, or a merchant backend.

In step 235, the kiosk or payment terminal, the cloud server, or the merchant backend, may generate and display an alternate payment provider-specific code for the selected alternate payment provider on its display. The alternate payment provider-specific code may include a merchant identifier, a payment terminal identifier, a transaction amount, and information specific to the selected alternate payment provider such as a transaction identifier.

For example, in one embodiment, once the cloud server receives the selection of the alternate payment provider, the cloud server may contact the alternate payment provider, which may return a transaction identifier to the cloud server. The cloud server or the kiosk or payment terminal may then generate the alternate payment provider-specific code and display it for the customer.

In step 240, the customer may scan the alternate payment provider-specific code using, for example, a camera on the mobile electronic device. In another embodiment, the code may be provided by RF communication, such as NFC. In one embodiment, the customer may scan the alternate payment provider-specific code using an application provided by the alternate payment provider; in another embodiment, the mobile electronic device may automatically launch the application provided by the alternate payment provider after the code is scanned.

In step 245, the mobile electronic device, or a computer application executed thereon, may communicate the contents of the machine-readable code (e.g., merchant identifier, unique identifier for the first payment terminal, transaction information) to the alternate payment provider.

In step 250, the alternate payment provider may complete the transaction, and in step 255, may communicate transaction completion to the kiosk or payment terminal, the merchant backend, and/or the mobile electronic device.

In step 260, the kiosk or payment terminal may inform the customer of the completion of the transaction.

Figure 3:
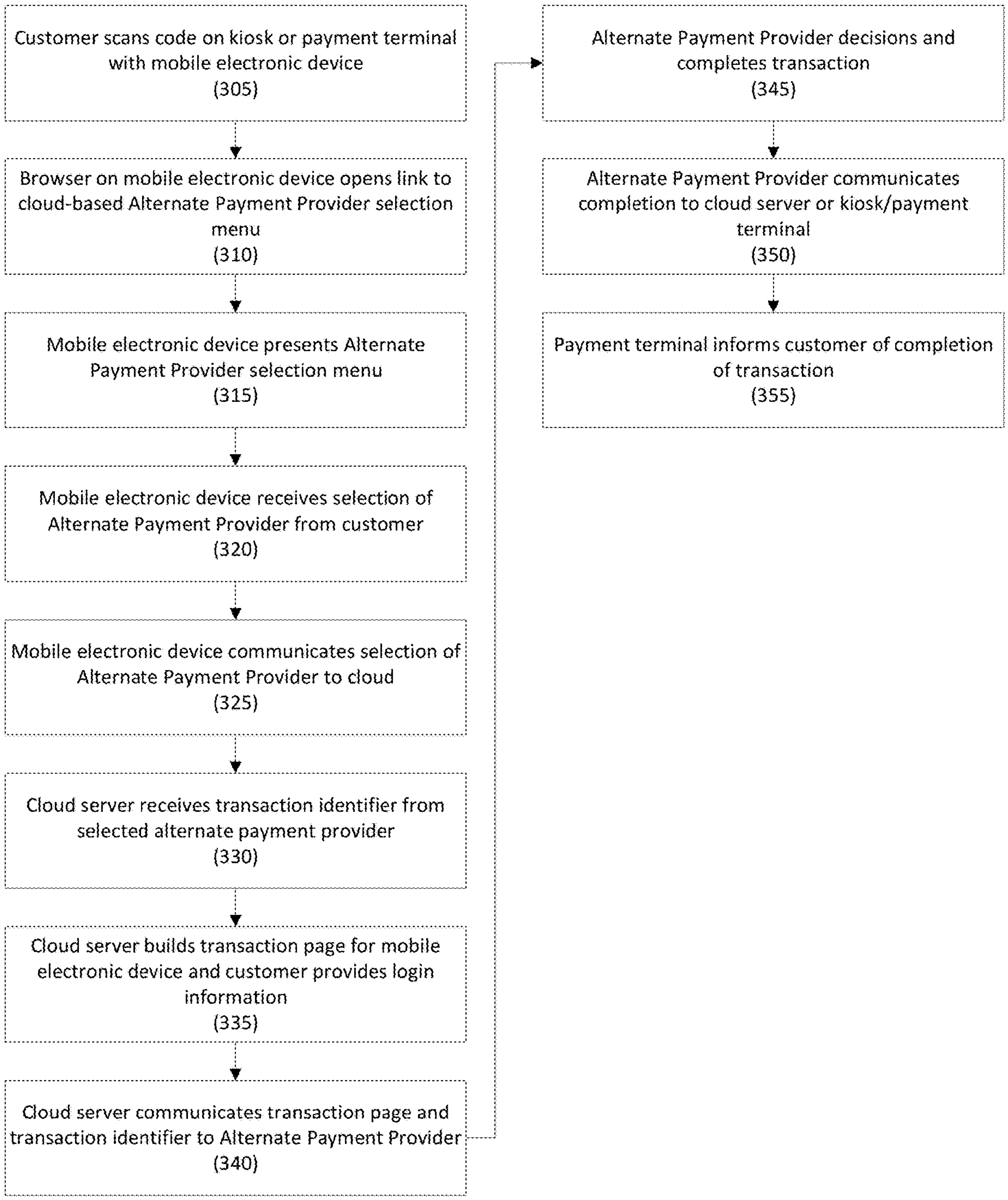
FIG. 3 depicts a method for touchless alternate payment provider selection at payment terminals using mobile electronic devices according to another embodiment.

Referring to FIG. 3, a method for touchless alternate payment provider selection at payment terminals using mobile electronic devices is disclosed according to another embodiment.

In step 305, a customer may approach a kiosk or payment terminal and may scan or enter a code using a mobile electronic device. In one embodiment, the code may be presented on a screen of the kiosk or payment terminal, add may include a static pointer to a cloud-based URL that is associated with the kiosk or payment terminal. The code may further include information to identify the merchant, the kiosk or payment terminal, transaction information, and any other information as is necessary and/or desired.

In one embodiment, a dynamic URL may be generated for each new connectivity session so that a consumer session and basket data can be sent back to the URL for audit trail recordings as necessary. The dynamic QR may include a merchant specific URL, unique kiosk or payment terminal information (e.g., a kiosk or payment terminal identifier), screen branding for the mobile electronic device screen to match merchant brand requirements, a secure transmission credential (e.g., a TLS 1.3 certificate), etc.

Other types of codes, including standard URLs, short URLs, etc. may be used as is necessary and/or desired. For example, the mobile electronic device may scan a URL and may browse to that location.

In one embodiment, the code may expire after a predetermined amount of time.

In step 310, a browser on the mobile electronic device may browse to the URL in the code. This may be similar to step 210, above.

In step 315, the browser or an application executed by the mobile electronic device may retrieve or receive a "menu" of alternate payment providers supported by the merchant and/or the payment terminal. This may be similar to step 215, above.

In step 320, the customer may select one of the supported alternate payment providers for the transaction, and in step 325, the browser or application may communicate the selection(s) to the cloud server. These steps may be similar to step 220 and 225, above.

In step 330, once the cloud server receives the selection of the alternate payment provider, the cloud server may contact the alternate payment provider, which may return a transaction identifier to the cloud server. The cloud server may optionally generate an alternate payment provider-specific code.

In step 335, the cloud server may build a transaction page that is presented on the mobile electronic device, and the customer may be prompted to log into the account with the selected alternate payment provider.

In one embodiment, the transaction page may include the alternate payment provider's transaction identifier.

In one embodiment, once the user enters the user's username and password to the transaction page, in step 340, the cloud server may communicate the transaction page and the alternate payment provider transaction identifier. In step 345, the alternate payment provider may decision the transaction, and in step 350, the cloud server may complete the transaction via authorization from the selected alternate payment provider. In step 355, the alternate payment provider may inform the cloud server or the payment terminal or kiosk that the transaction is complete. If necessary, the cloud server may inform the kiosk or payment terminal.

In step 345, the kiosk or payment terminal may inform the customer of the completion of the transaction. This may be similar step 260, above.

Figure 4:
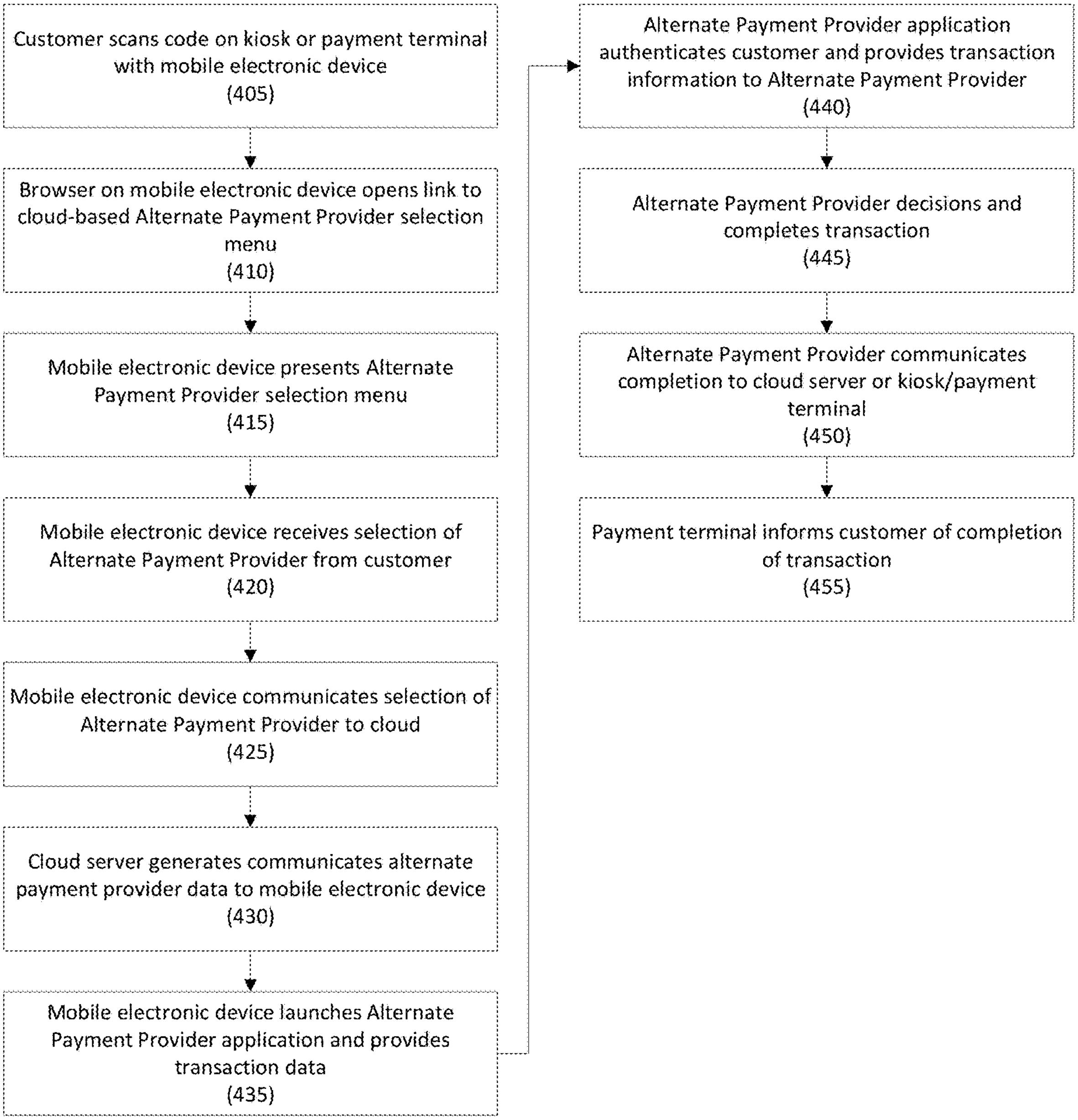
FIG. 4 depicts a method for touchless alternate payment provider selection at payment terminals using mobile electronic devices according to another embodiment.

Referring to FIG. 4, a method for touchless alternate payment provider selection at payment terminals using mobile electronic devices is disclosed according to another embodiment.

In step 405, a customer may approach a kiosk or payment terminal and may scan or enter a code using a mobile electronic device. This may be similar to step 305, above.

In step 410, a browser on the mobile electronic device may browse to the URL in the code. This may be similar to step 310, above.

In step 415, the browser or an application executed by the mobile electronic device may retrieve or receive a "menu" of alternate payment providers supported by the merchant and/or the payment terminal. This may be similar to step 415, above.

In step 420, the customer may select one of the supported alternate payment providers for the transaction, and in step 425, the browser or application may communicate the selection(s) to the cloud server. These steps may be similar to step 320 and 325, above.

In step 430, once the cloud server receives the selection of the alternate payment provider, the cloud server may contact the alternate payment provider, which may return a transaction identifier to the cloud server. The cloud server may optionally generate an alternate payment provider-specific code that may include the alternate payment provider's transaction identifier, and may communicate the data in the alternate payment provider-specific code to the mobile electronic device.

In another embodiment, the cloud server may communicate the data from the alternate payment provider, including the alternate payment provider's transaction identifier, to the mobile electronic device In step 435, the mobile electronic device may receive the data for and may launch the alternate payment provider application on the mobile electronic device.

If the alternate payment provider application is not installed, the mobile electronic device may prompt the user to install the alternate payment provider's application.

If the alternate payment provider does not use an application, the mobile electronic device may open a browser link to the alternate payment provider's website.

In step 440, the alternate payment provider application may authenticate the customer, and may provide transaction information to the alternate payment provider.

In step 445, the alternate payment provider application may decision and complete the transaction, and in step 450, the alternate payment provider may inform the cloud server or the payment terminal or kiosk that the transaction is complete. If necessary, the cloud server may inform the kiosk or payment terminal.

In step 455, the kiosk or payment terminal may inform the customer of the completion of the transaction. This may be similar step 345, above.

It will be appreciated by persons skilled in the art that the present invention is not limited by what has been particularly shown and described hereinabove. Rather, the scope of the present invention includes both combinations and subcombinations of features described hereinabove and variations and modifications thereof, which are not in the prior art. It should further be recognized that these embodiments are not exclusive to each other.

It will be readily understood by those persons skilled in the art that the embodiments disclosed herein, are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for touchless alternate payment provider selection at a payment terminal using a mobile electronic device, comprising:

at a cloud-based information processing apparatus comprising at least one computer processor:

receiving, from the mobile electronic device and at a uniform resource locator, a communication comprising an identifier for the payment terminal;

retrieving an alternate payment provider selection menu;

communicating the alternate payment provider selection menu to the mobile electronic device;

receiving an alternate payment provider selection from the mobile electronic device;

communicating the alternate payment provider selection to the payment terminal;

receiving an alternate payment provider transaction identifier from the selected alternate payment provider;

generating an alternate payment provider-specific code comprising the alternate payment provider transaction identifier for the selected alternate payment provider to be displayed at the payment terminal;

receiving customer information from the mobile electronic device;

communicating the customer information, the identifier for the payment terminal, and the alternate payment provider transaction identifier to the selected alternate payment provider;

receiving an indication that a transaction is complete; and communicating the indication to the payment terminal.

2. The method of claim 1, wherein the communication further comprises a secure transmission credential.

3. The method of claim 1, wherein the alternate payment provider selection menu comprises alternate payment providers supported by the kiosk or the payment terminal.

4. The method of claim 1, wherein the alternate payment provider selection menu comprises alternate payment providers that have applications installed on the mobile electronic device.

5. The method of claim 1, further comprising:

inputting the alternate payment provider-specific code into an alternate payment provider application for the selected alternate payment provider.

6. The method of claim 1, wherein the alternate payment provider transaction identifier comprises machine-readable code.

7. The method of claim 1, further comprising communicating data in the alternate payment provider-specific code to the mobile electronic device.

8. A method for touchless alternate payment provider selection at a payment terminal using a mobile electronic device, comprising:

at the mobile electronic device comprising at least one computer processor:

receiving, from the payment terminal, a uniform resource locator and an identifier for the payment terminal;

accessing a cloud server at the uniform resource locator;

receiving, from the cloud server, an alternate payment provider selection menu and displaying the alternate payment provider selection menu;

receiving a selection of an alternate payment provider from the alternate payment provider selection menu;

communicating the alternate payment provider selection to the cloud server;

receiving, at an alternate payment provider application on the mobile electronic device and from the payment terminal, an alternate payment provider-specific code, wherein the alternate payment provider application is for the selected alternate payment provider;

receiving customer information at the alternate payment provider application on the mobile electronic device;

communicating the customer information, the identifier for the payment terminal, and information from the alternate payment provider-specific code to the selected alternate payment provider; and completing a transaction at the alternate payment provider application on the mobile electronic device.

9. The method of claim 8, further comprising:

communicating, to the cloud server, a secure transmission credential.

10. The method of claim 8, wherein the alternate payment provider selection menu comprises alternate payment providers supported by the payment terminal.

11. The method of claim 8, wherein the displaying of the alternate payment provider selection menu comprises displaying only alternate payment providers in the alternate payment provider selection menu that have applications installed on the mobile electronic device.

12. The method of claim 8, wherein the uniform resource locator and the identifier for the kiosk or the payment terminal are received as a machine-readable code.

13. The method of claim 8, further comprising receiving the alternate payment provider-specific code as a machine-readable code.

14. The method of claim 8, wherein the alternate payment provider-specific code comprises an alternate payment provider transaction identifier.

15. A method for touchless alternate payment provider selection at a payment terminal using a mobile electronic device, comprising:

at a cloud-based information processing apparatus comprising at least one computer processor:

receiving, from the mobile electronic device and at a uniform resource locator, a communication comprising an identifier for the payment terminal, a merchant identifier, and transaction data;

retrieving an alternate payment provider selection menu;

communicating the alternate payment provider selection menu to the mobile electronic device;

receiving an alternate payment provider selection from the mobile electronic device;

receiving an alternate payment provider transaction identifier from the selected alternate payment provider;

generating a transaction page comprising the alternate payment provider transaction identifier and at least one field for receiving customer login information with the alternate payment provider and communicating the transaction page to the mobile electronic device;

receiving the customer login information from the mobile electronic device;

communicating the customer login information, the merchant identifier, the alternate payment provider transaction identifier, and the transaction data to the selected alternate payment provider;

receiving an indication that a transaction is complete; and communicating the indication to the payment terminal.

16. The method of claim 15, wherein the communication further comprises a secure transmission credential.

17. The method of claim 15, wherein the alternate payment provider selection menu comprises alternate payment providers supported by the payment terminal.

18. The method of claim 15, wherein the alternate payment providers selection menu comprises alternate payment providers that have applications installed on the mobile electronic device.

* * * * *